(12) United States Patent
Blaharski

(10) Patent No.: US 10,899,289 B2
(45) Date of Patent: Jan. 26, 2021

(54) REINFORCING TRIM PANEL FOR VEHICLE INTERIOR

(71) Applicant: Toyota Motor Engineering & Manufacturing North America, Inc., Plano, TX (US)

(72) Inventor: Jacob Blaharski, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 77 days.

(21) Appl. No.: 16/364,607

(22) Filed: Mar. 26, 2019

(65) Prior Publication Data

US 2020/0307469 A1    Oct. 1, 2020

(51) Int. Cl.
*B60R 13/02*    (2006.01)
(52) U.S. Cl.
CPC ...... *B60R 13/0206* (2013.01); *B60R 13/0256* (2013.01); *B60R 13/0262* (2013.01)

(58) Field of Classification Search
None
See application file for complete search history.

(56) References Cited

U.S. PATENT DOCUMENTS

| | | |
|---|---|---|
| 5,927,790 A | 7/1999 | Futschik et al. |
| 6,123,377 A | 9/2000 | Lecher et al. |
| 8,414,048 B1 | 4/2013 | Kwolek |
| 9,586,535 B2 | 3/2017 | Dalton et al. |
| 2007/0228762 A1 | 10/2007 | Vander Sluis et al. |
| 2015/0102621 A1* | 4/2015 | Smyth ................ B60R 13/0206 296/1.08 |
| 2016/0039361 A1* | 2/2016 | Mankame ........... B29C 65/5057 156/212 |

* cited by examiner

*Primary Examiner* — Lori L Lyjak
(74) *Attorney, Agent, or Firm* — Christopher G. Darrow; Darrow Mustafa PC

(57) ABSTRACT

A vehicle interior assembly includes a motor vehicle dashboard, a motor vehicle center console spaced apart from the dashboard, and a reinforcing trim panel formed separately from the dashboard and the center console. The reinforcing trim panel is attached to both the dashboard and the center console so as to anchor the center console to the dashboard.

7 Claims, 5 Drawing Sheets

REINFORCING TRIM PANEL FOR VEHICLE INTERIOR

TECHNICAL FIELD

The present invention generally relates to a vehicle interior assembly and, more particularly, to a vehicle interior assembly including a motor vehicle dashboard, a center console spaced apart from the dashboard, and a reinforcing trim panel formed separately from the dashboard and the center console and attached to both the vehicle dashboard and the center console.

BACKGROUND

One or more trim panels may be mounted in a vehicle interior, to enhance the appearance of the vehicle interior or as a structural reinforcement, for example. However, such trim panels are attached to a single element or component of the vehicle interior, and do not extend across a gap between components.

SUMMARY

In one aspect of the embodiments described herein, a vehicle interior assembly is provided. The vehicle interior assembly includes a motor vehicle dashboard, a motor vehicle center console spaced apart from the dashboard, and a reinforcing trim panel formed separately from the dashboard and the center console. The reinforcing trim panel is attached to both the dashboard and the center console so as to anchor the center console to the dashboard.

In another aspect of the embodiments described herein, a method is provided for reinforcing a vehicle center console structure spaced apart from a vehicle dashboard. The method includes steps of (a) providing a reinforcing trim panel including a first portion configured for attachment to the dashboard, and a second portion extending from the first portion and configured for attachment to the center console, and (b) attaching the reinforcing trim panel to the dashboard and to the center console, to anchor the center console to the dashboard.

DETAILED DESCRIPTION

Figure 1:
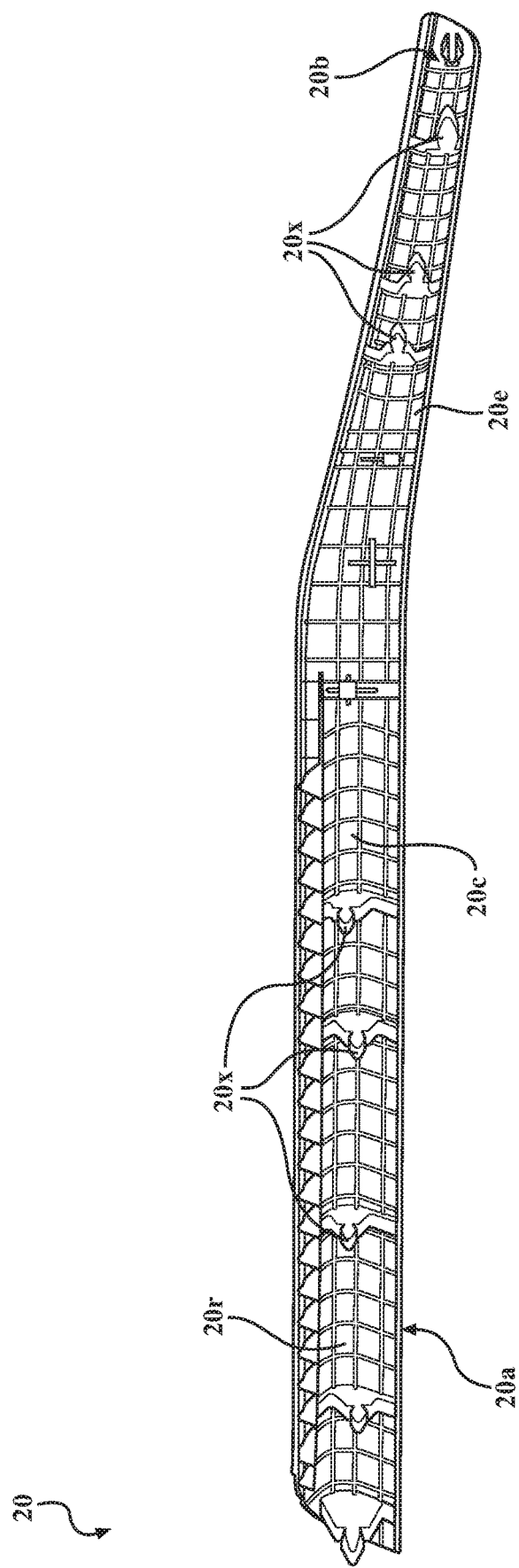
FIG. 1 is a schematic perspective view of a reinforcing trim panel in accordance with an embodiment described herein, configured for mounting in a vehicle interior.

Embodiments described herein relate to a vehicle interior assembly including a motor vehicle dashboard, a motor vehicle center console spaced apart from the dashboard, and a reinforcing trim panel formed separately from the dashboard and the center console. The reinforcing trim panel is attached to both the dashboard and the center console so as to anchor the center console to the dashboard. The reinforcing trim panel thus acts as a structural reinforcement for the center console.

In the embodiments described herein, similar elements of different embodiments have similar reference characters or labels, unless otherwise stated.

Referring to the drawings, in one or more arrangements, the reinforcing trim panel 20 may include a first portion 20a configured for attachment to a vehicle dashboard 50. A trim panel second portion 20b may extend from the first portion 20a and may be configured for attachment to a motor vehicle center console 70 spaced apart from the dashboard 50. Thus, the trim panel 20 may be configured to attach to two separate portions of the vehicle interior, along two different attachment planes P1 (FIG. 4, extending along the dashboard) and P2 (extending along the center console). The trim panel 20 may be configured to span a space S1 between the vehicle center console 70 and the vehicle dashboard 50 when the trim panel 20 is attached to the dashboard 50 and center console 70.

The trim panel first portion 20a may have an attachment side 20c configured for attachment to the vehicle dashboard 50. The trim panel first portion 20a may also have a facing side 20d configured to face in a direction away from the dashboard 50 and generally toward the vehicle occupant compartment and/or generally toward a vehicle occupant seated in a front passenger seat 40. The trim panel first portion facing side 20d may have a decorative finish or appearance.

The trim panel second portion 20b may have an attachment side 20e configured for attachment to an exterior surface of the vehicle center console 70. The trim panel second portion 20b may also have a facing side 20f configured to face in a direction away from the center console 70 and generally toward a vehicle occupant seated in a front passenger seat 40. The trim panel second portion facing side 20f may have a decorative finish or appearance.

The reinforcing trim panel 20 may be formed as a single piece, separate from both the center console 70 and the dashboard 50. As seen in FIG. 1, the reinforcing trim panel 20 may incorporate a webbed structure 20r, a ribbed structure, or any other structure or structures suitable for enhancing the stiffness and strength of the trim panel. The reinforcing trim panel 20 may be formed from any suitable material or materials, such as a polymer material.

Figure 2:
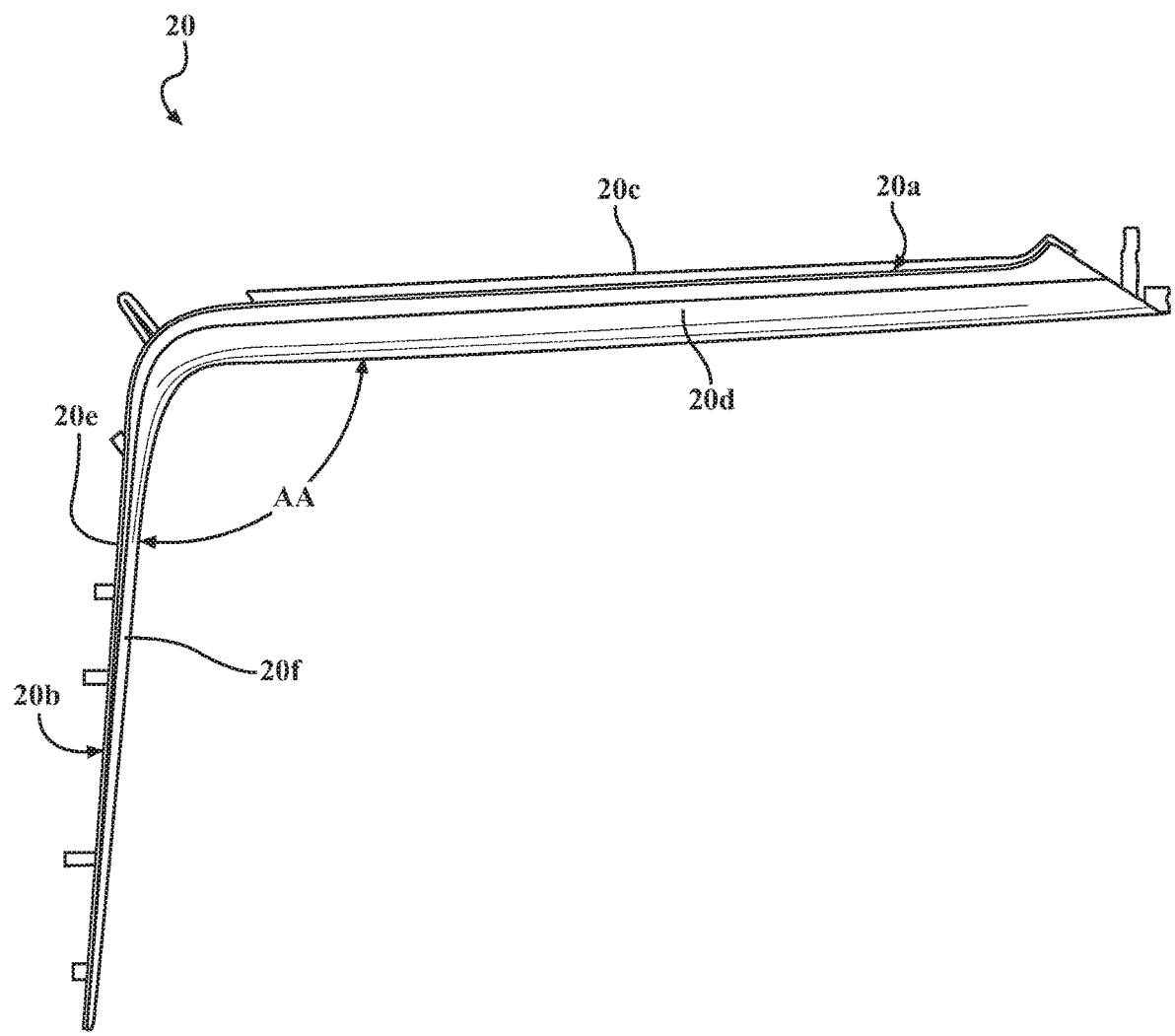
FIG. 2 is a schematic plan view of the reinforcing trim panel shown in FIG. 1.

Referring to FIG. 2, in one or more arrangements, reinforcing trim panel second portion 20b may extend from the first portion 20a so as to form an included angle AA therebetween within the range 90°-100°. The exact angle formed between the trim panel first portion 20a and the trim panel second portion 20b may depend on such factors as the shape of the center console 70, the position of the center console 70 relative to the dashboard 50, and other pertinent factors.

Figure 3:
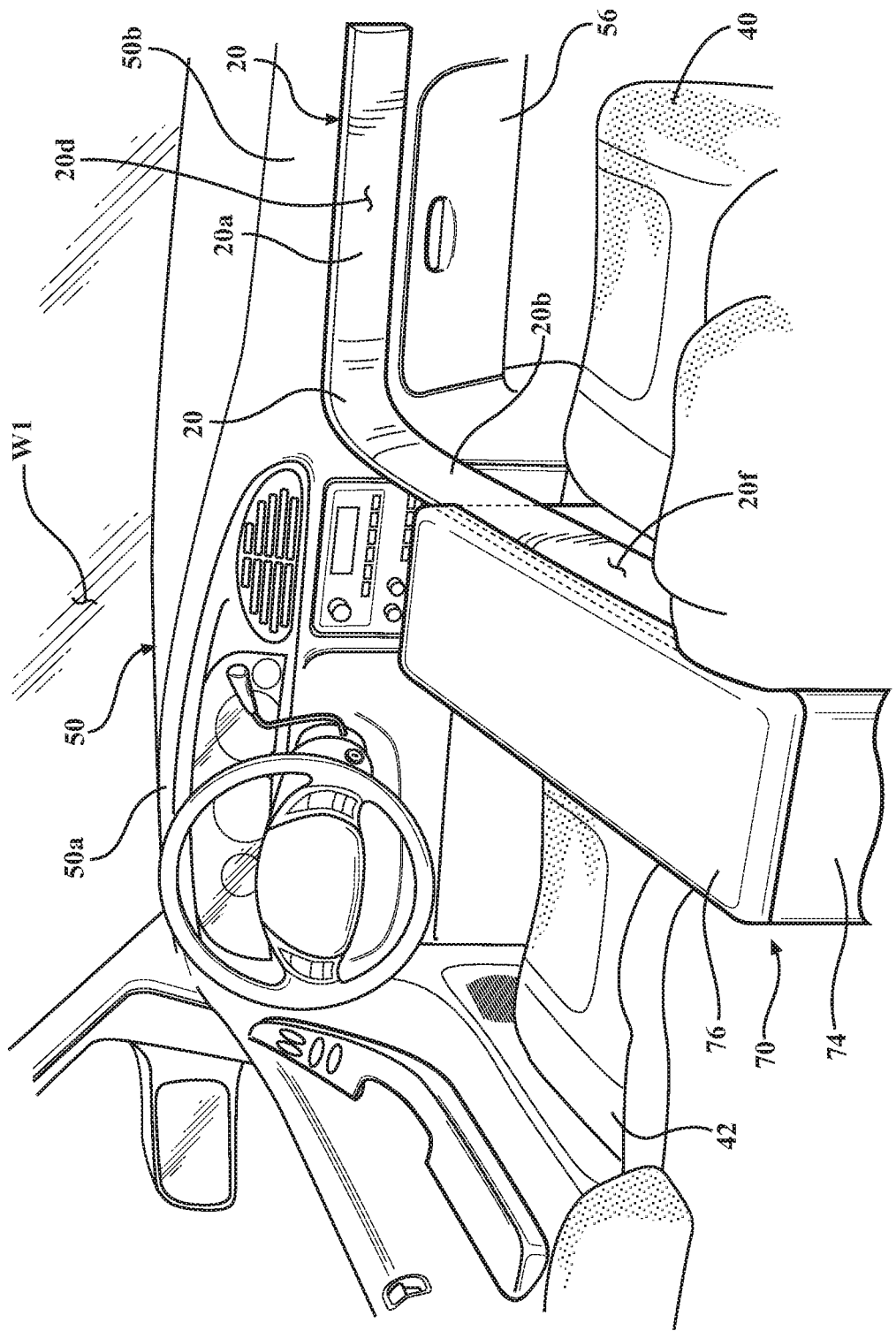
FIG. 3 is a schematic perspective view of a vehicle interior assembly incorporating a reinforcing trim panel as shown in FIGS. 1 and 2.
Figure 4:
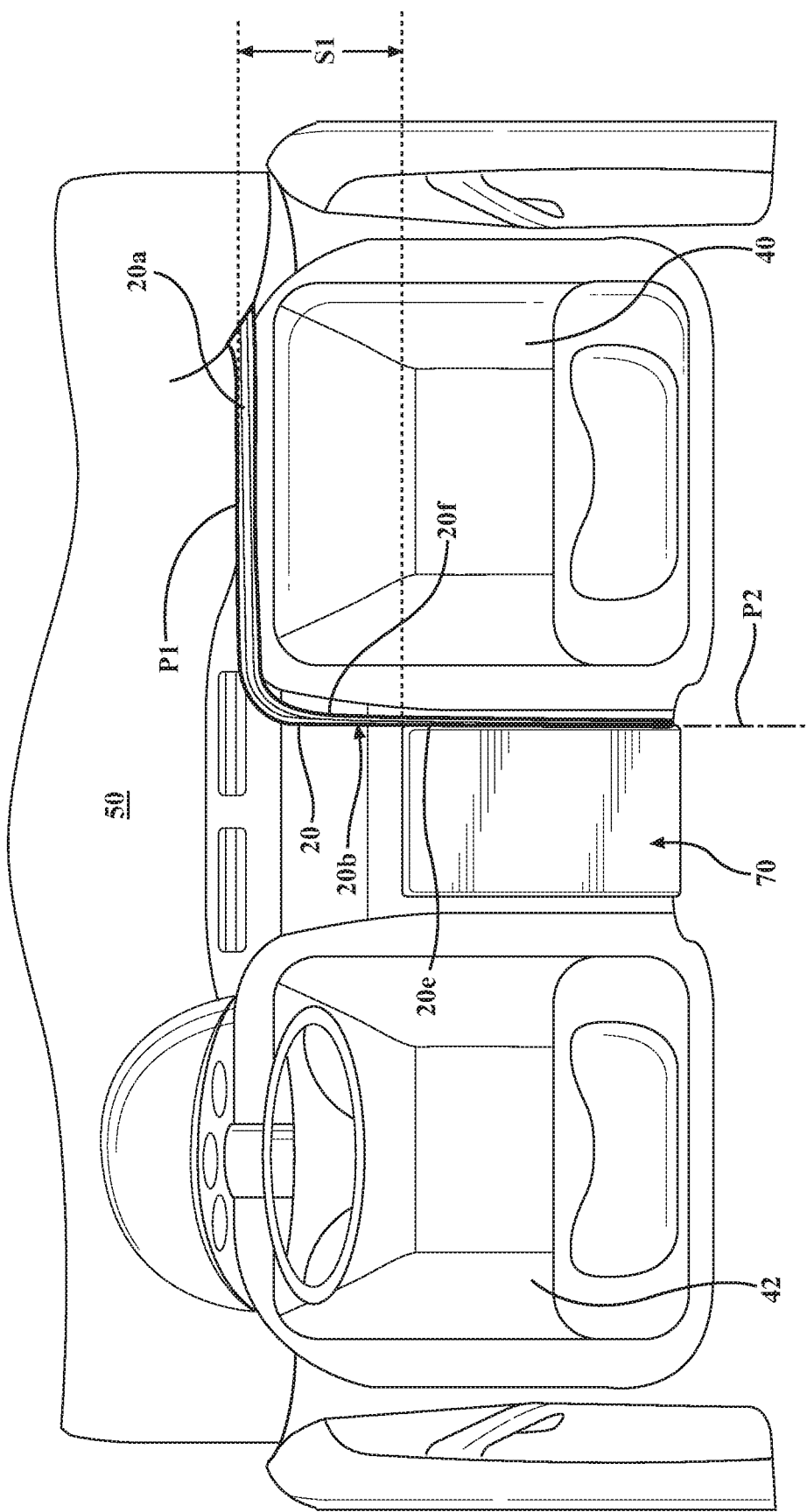
FIG. 4 is a plan view of the vehicle interior assembly shown in FIG. 3, showing the trim panel mounted in the vehicle in relation to a driver seat and a front passenger seat.

Referring to the drawings, and particularly to FIGS. 3 and 4, in one or more arrangements, the vehicle interior assembly may include a motor vehicle dashboard 50, a center console 70 spaced apart from the dashboard 50, and a reinforcing trim panel 20 in accordance with an embodiment described herein. The trim panel 20 may be formed separately from the vehicle dashboard 50 and the center console 70, and may be attached to both the dashboard 50 and the center console 70 so as to anchor the center console 70 to the dashboard 50. As used herein, "anchoring" the center console 70 directly to the vehicle dashboard 50 refers to connecting the center console 70 to the dashboard 50 via the reinforcing trim panel 20 in a manner that acts to stabilize or impede movement of the portion of the console 70 attached to the trim panel 20.

The vehicle dashboard 50 to which the first portion 20a of the trim panel 20 is attachable may comprise a frontal panel (generally designated 50a) positioned beneath the vehicle front window W 1, generally facing the driver of the vehicle and/or toward a rear of the vehicle and incorporating an instrument panel containing vehicle instruments and controls. The vehicle dashboard 50 may also include a portion 50b of the frontal panel 50a that would reside in front of a seated front passenger in front passenger seat 40.

The center console 70 may extend upwardly from a base or floor of the vehicle in a known manner and may reside between the driver seat 42 and the front passenger seat 40. The center console 70 may incorporate a covered storage compartment 74 and/or an armrest 76. The armrest 76 may serve as a cover for the storage compartment 74.

The reinforcing trim panel 20 may be attached to the dashboard 50 and to the center console 70 to provide the arrangement shown in FIGS. 3 and 4. The trim panel first portion 20a may be configured such that, when the first portion 20a is attached to the dashboard 50, the trim panel first portion 20a extends along the vehicle dashboard 50 above a glove compartment 56 of the vehicle.

The trim panel 20 may be attached to the dashboard 50 using suitable mechanical fasteners (for example, threaded fasteners) configured to securely and rigidly attach the trim panel to the dashboard. Referring to FIG. 1, in one or more arrangements, fasteners may be formed into the single-piece structure of the trim panel 20. These fasteners may be in the form of retention members 20x projecting from the attachment sides of the trim panel first portion 20a and/or second portion 20b, and configured for insertion into complementary holes formed in the dashboard 50 and/or center console 70. Each retention member 20x may be configured to form an interference fit or a snap fit with an associated hole in the dashboard 50 and/or center console 70.

For attaching the trim panel 20 to the dashboard 50 and to the center console 70, circular holes (not shown) may be provided in the dashboard. The trim panel retention members 20x may be inserted into the dashboard holes before attachment of trim panel second portion 20b to the center console 70. In order to ease attachment of trim panel second portion 20b to the center console after trim panel first portion 20a has been attached to dashboard 50, the center console holes (not shown) may be in the form of rectangular, longitudinal slots which allow the insertion of the trim panel retention members 20x along any of a range of positions encompassed by the slots. This allows the trim panel second portion 20b to be attached to the center console after attaching the trim panel first portion 20a to the dashboard, while accommodating assembly tolerances and possible positional variations of the trim panel second portion retention members 20x with respect to the center console holes.

Figure 5:
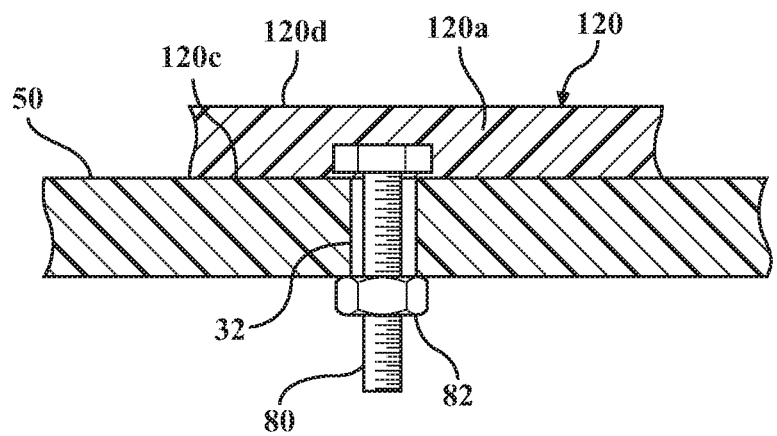
FIG. 5 is a schematic cross-sectional view showing one mode of attachment of a trim panel in accordance with an embodiment described herein to a dashboard or center console.
Figure 6:
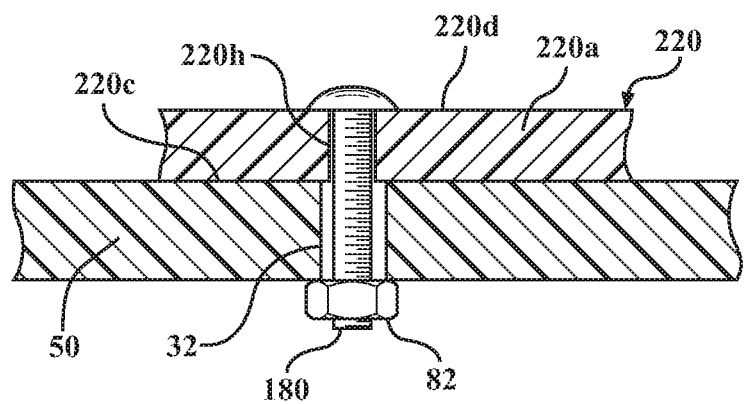
FIG. 6 is a schematic cross-sectional view showing another mode of attachment of a trim panel in accordance with an embodiment described herein to a dashboard or center console.

FIGS. 5 and 6 are cross-sectional views illustrating alternative embodiments 120, 220 of the trim panel structured for other modes of attachment to the dashboard 50. However, the attachment methods shown in FIGS. 5 and 6 may also be used for attaching the trim panel to the center console 70.

Referring to FIG. 5, in one arrangement, the reinforcing trim panel 120 may include a first portion 120a configured for attachment to the vehicle dashboard 50. A trim panel second portion (not shown) similar to second portion 20b shown in FIG. 4 may extend from the first portion 120a and may be configured for attachment to the motor vehicle center console 70 as previously described. Thus, the trim panel 120 may be configured to attach to two separate portions of the vehicle interior, along two different attachment planes P1 (as seen in FIG. 4, extending along the dashboard) and P2 (extending along the center console) as previously described with respect to trim panel 20. The trim panel 120 may be configured to span the space S1 (FIG. 4) between the vehicle center console 70 and the vehicle dashboard 50 in the same manner as trim panel 20 when the trim panel 120 is attached to the dashboard 50 and center console 70.

The trim panel first portion 120a may have an attachment side 120c configured for attachment to the vehicle dashboard 50. The trim panel first portion 120a may also have a facing side 120d configured to face in a direction away from the dashboard 50 and generally toward the vehicle occupant compartment and/or generally toward a vehicle occupant seated in a front passenger seat 40. The trim panel first portion facing side 120d may have a decorative finish or appearance.

Referring to FIG. 5, one or more fasteners 80 may be attached to trim panel 120 along the trim panel first portion attachment side 120c and may be inserted into receiving holes 32 formed in the dashboard 50 and secured therein using nuts 82 or another suitable mechanism, depending on the type of fastener used.

Referring to FIG. 6, in an alternative embodiment, a trim panel first portion 220a may have an attachment side 220c configured for attachment to the vehicle dashboard 50. The trim panel first portion 220a may also have a facing side 220d configured to face in a direction away from the dashboard 50 and generally toward the vehicle occupant compartment and/or generally toward a vehicle occupant seated in a front passenger seat 40. The trim panel first portion facing side 220d may have a decorative finish or appearance. In addition, one or more fasteners 180 may be inserted through holes 220h formed in the trim panel 220 along the trim panel first portion 220a, and then into the holes 32 formed in the dashboard 50, after which the fasteners 180 may be secured to the dashboard 50.

Securement of a reinforcing trim panel to the dashboard 50 and center console 70 as described herein provides structural support for the center console 70. The reinforcing trim panel embodiments described herein and attachment of an embodiment of the trim panel to the dashboard 50 and center console 70 also provide a method of reinforcing a vehicle center console structure 70 spaced apart from a vehicle dashboard 50. The method may include steps of (a) providing a reinforcing trim panel 20 including a first portion 20a configured for attachment to a vehicle dashboard 50, and a second portion 20b extending from the first portion 20a and configured for attachment to the vehicle center console 70, and (b) attaching the reinforcing trim panel 20 to the vehicle dashboard 50 and to the center console 70, to anchor the center console 70 to the vehicle dashboard 50.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle interior assembly comprising:
   a motor vehicle dashboard;
   a motor vehicle center console spaced apart from the dashboard; and
   a reinforcing trim panel formed separately from the dashboard and the center console and attached to both the vehicle dashboard and the center console so as to anchor the center console to the vehicle dashboard.

2. The vehicle interior assembly of claim 1 wherein the reinforcing trim panel is attached to the dashboard by at least one first mechanical fastener, and wherein the reinforcing trim panel is attached to the center console by at least one second mechanical fastener.

3. The vehicle interior assembly of claim 1 wherein the reinforcing trim panel comprises a first portion attached to the dashboard, and a second portion extending from the first portion and attached to the center console, such that the trim panel spans a space between the center console and the dashboard.

4. The vehicle interior assembly of claim 3 wherein the trim panel first portion extends along the dashboard above a glove compartment of the vehicle.

5. A reinforcing trim panel for a vehicle interior, the trim panel comprising:
   a first portion configured for attachment to a vehicle dashboard; and
   a second portion extending from the first portion and configured for attachment to a vehicle center console spaced apart from the dashboard, such that the trim panel spans a space between the vehicle center console and the vehicle dashboard when the trim panel is attached to the dashboard and center console.

6. The reinforcing trim panel of claim 5 wherein the second portion extends from the first portion so as to form an angle therebetween within a range of 90°-100°.

7. A method of reinforcing a vehicle center console structure spaced apart from a vehicle dashboard, comprising steps of:
   providing a reinforcing trim panel including a first portion configured for attachment to the dashboard, and a second portion extending from the first portion and configured for attachment to the center console; and
   attaching the reinforcing trim panel to the dashboard and to the center console, to anchor the center console to the dashboard.

* * * * *